(12) United States Patent
Ding et al.

(10) Patent No.: US 10,944,699 B2
(45) Date of Patent: Mar. 9, 2021

(54) METHOD AND DEVICE FOR QUESTIONING AND ANSWERING

(71) Applicant: NETEASE, Inc., Grand Cayman (KY)

(72) Inventors: Lei Ding, Hangzhou (CN); Liang Ruan, Hangzhou (CN); Hangsheng Xu, Hangzhou (CN)

(73) Assignee: NETEASE, INC., Grand Cayman (KY)

( * ) Notice: Subject to any disclaimer, the term of this patent is extended or adjusted under 35 U.S.C. 154(b) by 234 days.

(21) Appl. No.: 15/317,495

(22) PCT Filed: Jul. 18, 2014

(86) PCT No.: PCT/CN2014/082521
§ 371 (c)(1),
(2) Date: Feb. 16, 2017

(87) PCT Pub. No.: WO2015/188425
PCT Pub. Date: Dec. 17, 2015

(65) Prior Publication Data
US 2017/0201474 A1    Jul. 13, 2017

(30) Foreign Application Priority Data
Jun. 10, 2014  (CN) .......................... 201410256268.1

(51) Int. Cl.
*H04L 12/58* (2006.01)
*H04L 29/06* (2006.01)

(52) U.S. Cl.
CPC ............ *H04L 51/04* (2013.01); *H04L 51/046* (2013.01); *H04L 51/10* (2013.01); *H04L 51/12* (2013.01); *H04L 51/16* (2013.01); *H04L 67/42* (2013.01)

(58) Field of Classification Search
CPC ....... H04L 51/04; H04L 51/046; H04L 51/10; H04L 51/12; H04L 51/16; H04L 67/42
(Continued)

(56) References Cited

U.S. PATENT DOCUMENTS 7,899,867 B1 *   3/2011   Sherstinsky ............ H04L 51/04
                                                 709/203
8,037,147 B1 *  10/2011   Herold .................... G06Q 10/10
                                                 709/206
(Continued)

FOREIGN PATENT DOCUMENTS

CN       101017489 A     8/2007
CN       101431479 A     5/2009
(Continued)

OTHER PUBLICATIONS

International Search Report for PCT/CN2014/082521, (English and Chinese), ISA/CN, Haidian District, Beijing, dated Feb. 27, 2015.
(Continued)

*Primary Examiner* — Michael Won
(74) *Attorney, Agent, or Firm* — Nixon & Vanderhye P.C.

(57) ABSTRACT

Embodiments of the present invention provide a method for questioning and answering. For example, the method may comprise: receiving a message input by a user; sending the message to a question-and-answer server such that the question-and-answer server sends the message to one or more answerer clients; in response to users of the answerer clients performing a real time reply operation for the message, entering into a real time session with the users of the answerer clients so as to obtain a reply message from the users of the answerer clients through the real time session. With the present invention, a questioner and an answerer may send and receive messages through clients dedicated for questioning and answering, and both parties may enter into a one-to-one or one-to-many real time session when the answerer replies in real time, therefore better immediacy and better user experience may be achieved. In addition, embodiments of the present invention provide a device for questioning and answering.

15 Claims, 5 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 8,504,418 | B1* | 8/2013 | Dimock | G06Q 30/0239 |
| | | | | 705/14.19 |
| 8,515,888 | B2* | 8/2013 | Ventilla | G06Q 10/10 |
| | | | | 706/45 |
| 8,712,943 | B1* | 4/2014 | Kim | G06Q 50/01 |
| | | | | 706/45 |
| 9,424,581 | B2* | 8/2016 | Altberg | G06Q 30/02 |
| 9,576,045 | B2* | 2/2017 | Ross | G06Q 30/0201 |
| 10,192,458 | B2* | 1/2019 | Ajmera | G09B 7/00 |
| 2006/0168087 | A1* | 7/2006 | Lescuyer | H04L 51/04 |
| | | | | 709/207 |
| 2008/0133671 | A1* | 6/2008 | Kalaboukis | H04L 51/00 |
| | | | | 709/206 |
| 2008/0177853 | A1* | 7/2008 | Chen | H04L 12/1831 |
| | | | | 709/206 |
| 2009/0119371 | A1* | 5/2009 | Chang | H04L 12/1827 |
| | | | | 709/206 |
| 2009/0125598 | A1* | 5/2009 | Sun | H04L 67/24 |
| | | | | 709/206 |
| 2010/0211646 | A1* | 8/2010 | McDevitt | H04L 51/04 |
| | | | | 709/206 |
| 2010/0306249 | A1* | 12/2010 | Hill | G06Q 50/01 |
| | | | | 707/769 |
| 2011/0106895 | A1* | 5/2011 | Ventilla | H04L 12/66 |
| | | | | 709/206 |
| 2012/0166457 | A1* | 6/2012 | Ross | G06F 16/9535 |
| | | | | 707/755 |
| 2012/0246576 | A1* | 9/2012 | Baldwin | G06Q 10/10 |
| | | | | 715/751 |
| 2013/0036184 | A1* | 2/2013 | Hung | G06Q 10/109 |
| | | | | 709/206 |
| 2013/0097262 | A1* | 4/2013 | Dandison | H04L 51/36 |
| | | | | 709/206 |
| 2014/0074629 | A1* | 3/2014 | Rathod | G06Q 30/0277 |
| | | | | 705/14.73 |
| 2014/0129651 | A1* | 5/2014 | Gelfenbeyn | H04L 51/32 |
| | | | | 709/206 |
| 2014/0164126 | A1* | 6/2014 | Nicholas | A63F 9/24 |
| | | | | 705/14.58 |
| 2014/0280633 | A1* | 9/2014 | Ravindran | H04L 51/066 |
| | | | | 709/206 |
| 2014/0310357 | A1* | 10/2014 | Banatwala | H04L 51/04 |
| | | | | 709/206 |
| 2015/0088998 | A1* | 3/2015 | Isensee | G06F 40/279 |
| | | | | 709/206 |
| 2015/0100581 | A1* | 4/2015 | O'Donnell | H04L 67/10 |
| | | | | 707/737 |
| 2015/0356630 | A1* | 12/2015 | Hussain | G06Q 30/0273 |
| | | | | 705/14.69 |
| 2018/0196796 | A1* | 7/2018 | Wu | G06F 16/9024 |

FOREIGN PATENT DOCUMENTS

| | | |
|---|---|---|
| CN | 102663129 A | 9/2012 |
| CN | 103208092 A | 7/2013 |
| CN | 103369009 A | 10/2013 |

OTHER PUBLICATIONS

Written Opinion of the ISA for PCT/CN2014/082521 (Chinese), ISA/CN, Haidian District, Beijing, dated Feb. 27, 2015.
Corresponding CN office action dated Nov. 15, 2016.

* cited by examiner

METHOD AND DEVICE FOR QUESTIONING AND ANSWERING

This application claims the priority benefit of Chinese Patent Application No. 201410256268.1, titled "A Method and Device for Questioning and Answering", filed on Jun. 10, 2014 in the Chinese Patent Office, the contents of which are incorporated by reference herein in their entirety for all purposes.

TECHNICAL FIELD

Embodiments of the present invention relate to the field of the Internet, and more particularly, to a method and device for questioning and answering.

BACKGROUND OF THE INVENTION

This section is intended to provide the background or context for the embodiments of the present invention as recited in the claims. The fact that following descriptions being included in this section itself cannot be used as an admission of prior art.

In the field of the Internet, it is a very common way for questioning and answering among users through asking questions and giving answers based on a forum provided by a web portal. Typically, a questioner posts a question on a forum, answerers give their answers by posting follow-up comments after reading the question, and the questioner then finds out a satisfactory answer from the follow-up comments.

SUMMARY OF THE INVENTION

However, a questioner may not see an answer given by an answerer in a timely manner since posting, reading posts and follow-up posting on a forum are merely unilateral and spontaneous behaviors of questioners and answerers, thus the delay from the non-real time questioning and answering approach in the prior art may disappoint the questioner.

To this end, there is a need for an improved method for questioning and answering to address the delay problem in the prior art.

In this context, the embodiments of the present invention aim to provide a method and device for questioning and answering.

In a first aspect of the embodiments of the invention, there is provided a method for questioning and answering applied at a questioner client, which may comprise, for example: receiving a message input by a user; sending the message to a question-and-answer server such that the question-and-answer server sends the message to one or more answerer clients; and in response to users of the answerer clients performing a real time reply operation for the message, entering into a real time session with the users of the answerer clients so as to obtain a reply message from the users of the answerer clients through the real time session.

In a second aspect of the embodiments of the invention, there is provided a device for questioning and answering configured at a questioner client, which may comprise, for example: a message inputting unit that may be configured to receive a message input by a user; a message sending unit that may be configured to send the message to a question-and-answer server such that the question-and-answer server sends the message to one or more answerer clients; and a session unit that may be configured to, in response to users of the answerer clients performing a real time reply operation for the message, enter into a real time session with the users of the answerer clients so as to obtain a reply message from the users of the answerer clients through the real time session.

In a third aspect of the embodiments of the invention, there is provided a method for questioning and answering applied at a question-and-answer server, which may comprise, for example: receiving a message sent by a user through a questioner client; and sending the message to one or more answerer clients, such that the questioner client, in response to users of the answerer clients performing a real time reply operation for the message, enters into a real time session with the users of the answerer clients so as to obtain a reply message from the users of the answerer clients through the real time session.

In a fourth aspect of the embodiments of the invention, there is provided a device for questioning and answering configured at a question-and-answer server, which may comprise, for example: a message transferring unit that may be configured to receive a message sent by a user through a questioner client; and a message forwarding unit that may be configured to send the message to one or more answerer clients, such that the questioner client, in response to users of the answerer clients performing a real time reply operation for the message, enters into a real time session with the users of the answerer clients so as to obtain a reply message from the users of the answerer clients through the real time session.

In a fifth aspect of the embodiments of the invention, there is provided a method for questioning and answering applied at an answerer client, which may comprise, for example: receiving a message sent by a question-and-answer server, wherein the message is sent by a user of a questioner client through the questioner client to the question-and-answer server; and in response to a user of the answerer client performing a real time reply operation for the message, entering into a real time session with the user of the questioner client so as to send a reply message to the user of the questioner client through the real time session.

In a sixth aspect of the embodiments of the invention, there is provided a device for questioning and answering configured at an answerer client, which may comprise, for example: a message receiving unit that may be configured to receive a message sent by a question-and-answer server, wherein the message is sent by a user of a questioner client through the questioner client to the question-and-answer server; and a message answering unit that may be configured to enter into, in response to a user of the answerer client performing a real time reply operation for the message, a real time session with the user of the questioner client so as to send a reply message to the user of the questioner client through the real time session.

With the method and device for questioning and answering according to the embodiments of the invention, a questioner and an answerer may send and receive messages through clients dedicated for questioning and answering, and both parties may accordingly enter into a one-to-one or one-to-many real time session when the answerer replies in real time so that the questioner may be able to obtain an answer given by the answerer in real time, therefore better immediacy and better user experience may be achieved.

BRIEF DESCRIPTION OF THE DRAWINGS

The above and other objectives, features and advantages of exemplary embodiments of the invention will become more readily understandable by reading the following detailed description with reference to the accompanying drawings. A number of embodiments of the invention are shown in an exemplary and unrestrictive manner in the drawings, of which.

In the drawings, identical or corresponding numerals denote identical or corresponding parts.

DETAILED DESCRIPTION OF THE INVENTION

Figure 1:
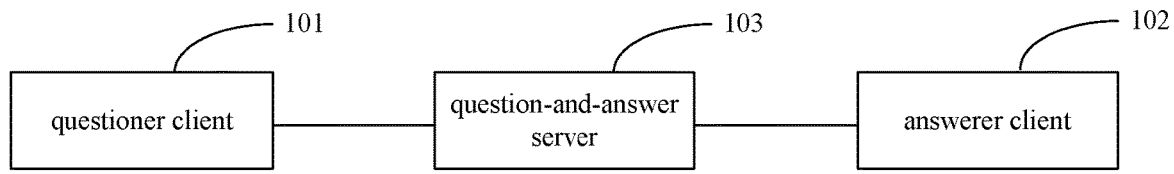
FIG. 1 schematically illustrates an application scenario in accordance with an embodiment of the invention.

The principles and spirit of the present invention will be described below with reference to a number of exemplary embodiments. It should be understood that those embodiments are given merely for those skilled in the art to better understand and thus implement the invention, and do not limit the scope of the invention in any way. On the contrary, those embodiments are provided to make the disclosure more thorough and complete, so that the scope of the disclosure may be completely conveyed to those skilled in the art.

It is known to those skilled in the art that the embodiments of the invention may be implemented as a system, device, apparatus, method or computer program product. Thus, the present disclosure may be specifically implemented in the form of complete hardware, complete software (including firmware, resident software, microcode, etc.), or combinations of hardware and software.

A method and device for questioning and answering are proposed in accordance with the embodiments of the invention.

It is to be understood that, in this context, any number of elements in the drawings is intended to be illustrative rather than limiting, and any naming is used merely for distinguishing purpose without any meaning of limitation.

The principles and spirit of the present invention will be described in details below, with reference to a number of representative embodiments of the invention.

Briefing of the Invention

The inventors have found that the non-real time nature of existing approaches for questioning and answering based on posting/follow-up posting on a forum may lead to a delay in getting an answer to a question. In order to solve this problem, the inventors have found that specialized clients dedicated for questioning and answering may be provided. In particular, a questioner client may send a message to a question-and-answer sever in response to a user inputting the message on the questioner client, the question-and-answer sever may send the message to one or more answerer clients upon receiving the message, and the user of the questioner client and users of the answerer clients may accordingly enter into a one-to-one or one-to-many real time session when the users of the answerer clients perform a real time reply operation for the message. Better immediacy may be achieved since a questioner and an answerer may send and receive messages through clients dedicated for questioning and answering, and both parties may accordingly enter into a one-to-one or one-to-many real time session when the answerer replies in real time.

Having presented the basic principles of the present invention, various non-limiting embodiments of the invention will be described below with particularity.

Overview of Application Scenarios

First, referring to FIG. 1, a questioner client 101 and an answerer client 102 may be clients running on a terminal such as a desktop computer, a tablet computer, a smart mobile phone and the like, for example, an instant messaging client such as "Yixin (or NetEase EasyChat')". A question-and-answer server 103 receives a message from the questioner client 101, and sends the message to one or more answerer clients 102, such that a user of the questioner client and users of the answerer clients enter into a session when the users of the answerer clients perform a real time reply operation for the message.

First Exemplary Method

A method for questioning and answering applied at a questioner client in accordance with an exemplary embodiment of the present invention will be described below with reference to FIG. 2, in connection with the application scenario of FIG. 1. It should be noted that the above application scenario is shown merely to facilitate the understanding of the spirit and principles of the invention, and there is no limitation to the embodiments of the invention in this respect. On the contrary, the embodiments of the invention may be applicable to any suitable scenario.

Figure 2:
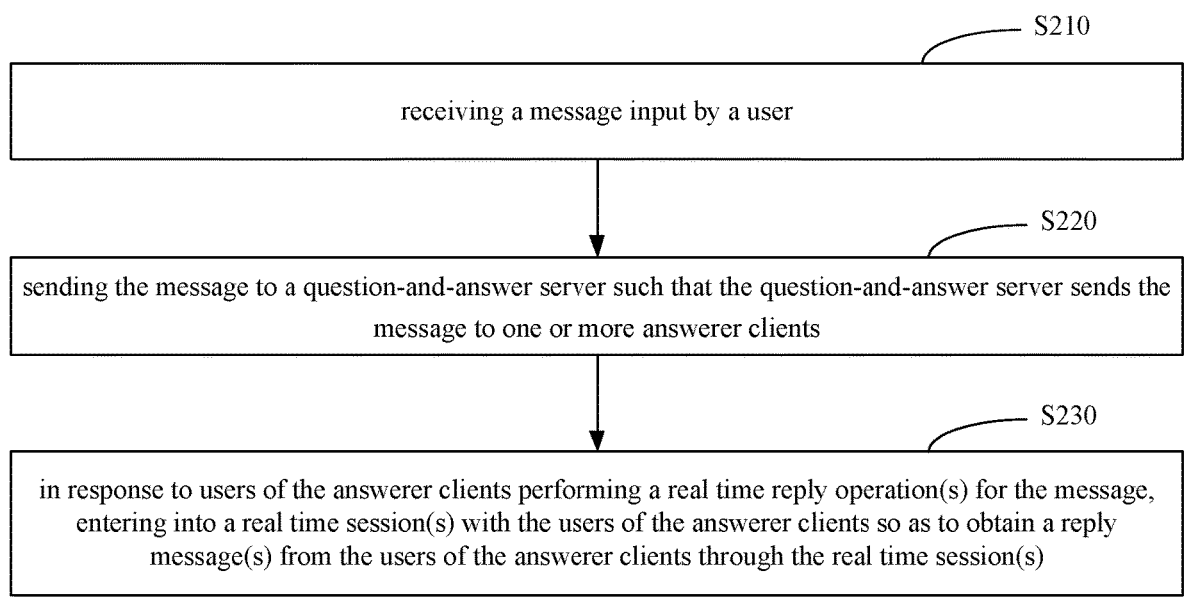
FIG. 2 schematically illustrates a flow diagram of a method for questioning and answering applied at a questioner client in accordance with an embodiment of the invention.

For instance, referring to FIG. 2, there is shown a flow diagram of a method for questioning and answering applied at a questioner client provided by an example of the present invention. As shown, a feasible embodiment of the example of the present invention may comprise:

S210: receiving a message input by a user.

For example, the received message may be a voice message, a text message, or a multimedia message such as a picture, a video and the like. As another example, the message may be a question message for questioning, e.g. who can answer a question about the filing process for an US patent.

S220: sending the message to a question-and-answer server such that the question-and-answer server sends the message to one or more answerer clients;

S230: in response to users of the answerer clients performing a real time reply operation for the message, entering into a real time session with the users of the answerer clients so as to obtain a reply message from the users of the answerer clients through the real time session.

As an example, in some feasible embodiments, the questioner client may, in response to receiving a phone call made in real time by the users of the answerer clients for the message, enter into a voice session with the users of the answerer clients by picking up the call so as to obtain a reply message from the users of the answerer clients through the voice session.

As another example, in some other feasible embodiments, the questioner client may, in response to the users of the answerer clients joining into an instant messaging session group established by the question-and-answer server for the user of the questioner client for the message, enter into an instant messaging session with the users of the answerer clients through the instant messaging session group so as to obtain a reply message from the users of the answerer clients through the instant messaging session. It should be understood that, the reply message may be sent to all members of the instant messaging session group.

With the method provided by the example of the present invention, better immediacy may be achieved since a questioner and an answerer may send and receive messages through clients dedicated for questioning and answering, and both parties may accordingly enter into a one-to-one or one-to-many real time session when the answerer replies in real time. For example, in the case of a message sent by the questioner client being a question message, the question may be received by the answerer client, and both parties may enter into an instant session when the user of the answerer client performs a real time reply operation for answering the question, thereby providing a platform for answering questions with instant interaction to the users.

First Exemplary Device

Having introduced the method for questioning and answering applied at a questioner client in accordance with the exemplary embodiments of the present invention, a device for questioning and answering configured at a questioner client in accordance with an exemplary embodiment of the present invention will then be described in details below with reference to FIG. 3.

Figure 3:
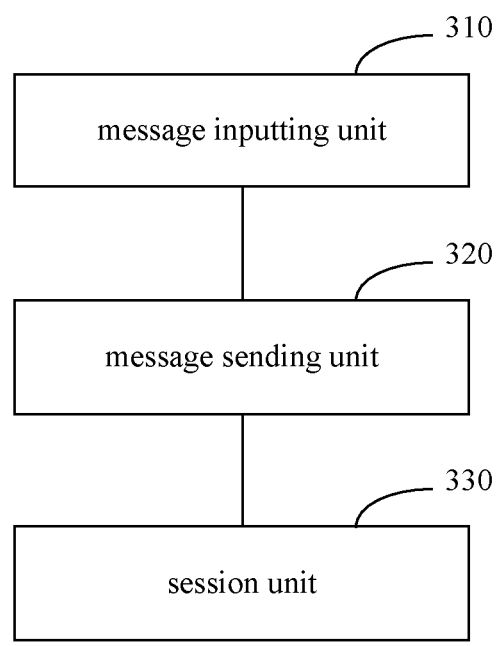
FIG. 3 schematically illustrates a structure diagram of a device for questioning and answering configured at a questioner client in accordance with an embodiment of the invention.

For instance, referring to FIG. 3, there is shown a structure diagram of a device for questioning and answering configured at a questioner client provided by an example of the present invention. As shown, a feasible embodiment of the example of the present invention may comprise: a message inputting unit 310 that may be configured to receive a message input by a user; a message sending unit 320 that may be configured to send the message to a question-and-answer server such that the question-and-answer server sends the message to one or more answerer clients; and a session unit 330 that may be configured to, in response to users of the answerer clients performing a real time reply operation for the message, enter into a real time session with the users of the answerer clients so as to obtain a reply message from the users of the answerer clients through the real time session.

As an example, in some feasible embodiments, the session unit 330 may be configured to, in response to receiving a phone call made in real time by the users of the answerer clients for the message, enter into a voice session with the users of the answerer clients by picking up the call so as to obtain a reply message from the users of the answerer clients through the voice session.

As another example, in some other feasible embodiments, the session unit 330 may be configured to, in response to the users of the answerer clients joining into an instant messaging session group established by the question-and-answer server for the user of the questioner client for the message, enter into an instant messaging session with the users of the answerer clients through the instant messaging session group so as to obtain a reply message from the users of the answerer clients through the instant messaging session.

With the device provided by the example of the present invention being configured at a questioner client, better immediacy may be achieved since a questioner and an answerer may send and receive messages through clients dedicated for questioning and answering, and both parties may enter into a one-to-one or one-to-many real time session when the answerer replies in real time.

Second Exemplary Method

A method for questioning and answering applied at a question-and-answer server in accordance with an exemplary embodiment of the present invention will be described below with reference to FIG. 4, in connection with the application scenario of FIG. 1.

Figure 4:
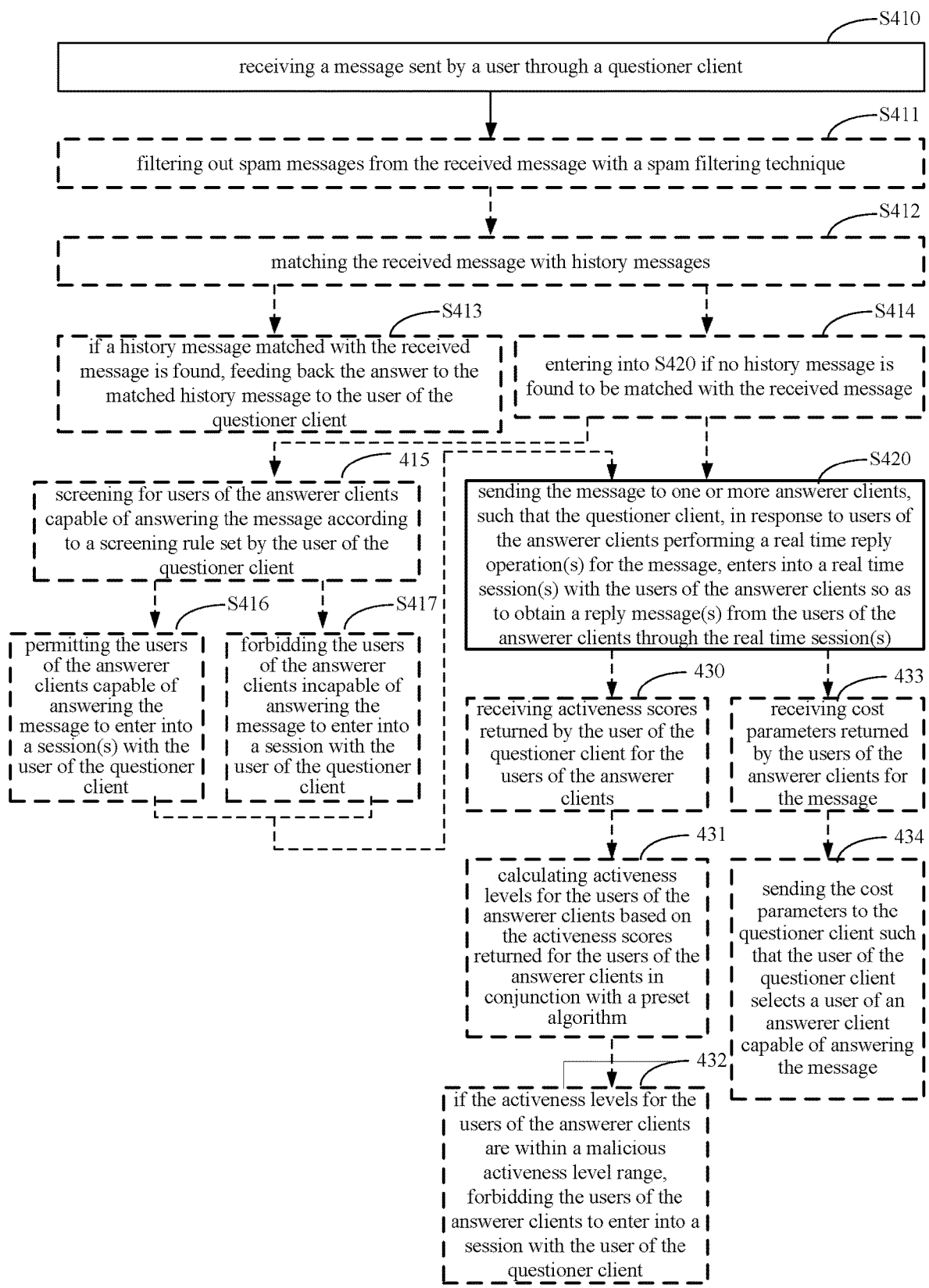
FIG. 4 schematically illustrates a flow diagram of a method for questioning and answering applied at a question-and-answer server in accordance with an embodiment of the invention.

For instance, referring to FIG. 4, there is shown a flow diagram of a method for questioning and answering applied at a question-and-answer server provided by an example of the present invention. As shown, a feasible embodiment of the example of the present invention may comprise:

S410: receiving a message sent by a user through a questioner client.

S420: sending the message to one or more answerer clients, such that the questioner client, in response to users of the answerer clients performing a real time reply operation for the message, enters into a real time session with the users of the answerer clients so as to obtain a reply message from the users of the answerer clients through the real time session.

It can be seen that, with the method provided by the example of the present invention being applied at the question-and-answer server, better immediacy may be achieved since a questioner and an answerer may send and receive messages through clients dedicated for questioning and answering, and both parties may enter into a one-to-one or one-to-many real time session when the answerer replies in real time. For example, in a feasible embodiment, a message sent by the questioner client may be a question message for questioning. In this embodiment, the question may be received by the answerer client, and both parties may enter into an instant session when the user of the answerer client performs a real time reply operation for answering the question, thereby providing a platform for answering questions with instant interaction to the users.

It should be noted that, specific embodiments for the user of the questioner client and the users of the answerer clients to enter into a session when the users of answerer clients perform the real time reply operation for the message are not limited. For example, in some embodiments, when the users of the answerer clients make a phone call in real time to the user of the questioner client for the message, a voice session may be entered into by picking up the call. In some other embodiments, a session may be entered into through an instant messaging session group established by the question-and-answer server for the user of the questioner client. More specifically, the question-and-answer server may establish an instant messaging session group for the user of the questioner client, so that the users of the answerer clients and the user of the questioner client may enter into a session through the instant messaging session group, so as to receive a reply message sent in real time by the users of the answerer clients for the message, and send the reply message to members of the instant messaging session group. The user of the questioner client, as a member of the instant messaging session group, may receive the reply message.

The timing for establishing the instant messaging session group for the user of the questioner client is not limited. For example, the instant messaging session group may be established when a message is received, or when a reply message for the message is received for the first time. The members of the instant messaging session group comprise at least the user of the questioner client and the users of the answerer clients feeding back the reply message. If other users capable of answering the message are allowed to participate, these other users capable of answering the message may also be added into the instant messaging session group when the instant messaging session group is established.

Specific embodiments for the question-and-answer server to send the message to the one or more answerer clients in the example of the present invention are not limited. For example:

In some feasible embodiments, the question-and-answer server may send the message to all of the answerer clients. It should be noted that, the phrase "all of the answerer clients" may refer to answerer clients being used by all users other than the questioning user, among all users registered on the question-and-answer server. All users of the answerer clients may be added into the messaging session group in conjunction with the above embodiments of entering into a session through the instant messaging session group.

In some feasible embodiments, the question-and-answer server may send the message to answerer clients whose geographic locations are within a preset range (e.g., 1 km) from the geographic location of the questioner client. As an example, the question-and-answer server may acquire in real time the geographic location from the questioner client that is obtained by the questioner client via a GPS system (Global Positioning System), acquire geographic locations from all answerer clients that are obtained by the answerer clients via a GPS system, and compare the geographic location of the questioner client and the geographic locations of the answerer clients, thereby determining answerer clients that are within a preset range from the geographic location of the questioner client. The users of the answerer clients that are within a preset range from the geographic location of the questioner client may be added into the instant messaging session group in conjunction with the above embodiments of entering into a session through the instant messaging session group.

In some feasible embodiments, the question-and-answer server may send the message to answerer clients having user tags that are matched with the message. For example, the message may be sent to answerer clients having user tags that are matched with keywords in the message. In this embodiment, a user tag may be stored in advance in user information by the question-and-answer server, wherein the user tag may be selected by a user himself/herself, or may be obtained by the server through analysis on the basis of user behaviors. For example, the user tag information may be 'mathematician', 'artist', 'driver' and the like. Users of answerer clients having user tags that are matched with keywords in the message may be added into the messaging session group in conjunction with the above embodiments of entering into a session through the instant messaging session group. In this embodiment, different question-and-answer groups may be categorized according to the user tag to quickly find a suitable answerer for a questioner, thereby integrating question-and-answer transactions for different types of messages into one platform. In addition, a user may also modify a user tag set on the question-and-answer server through a client.

It should be noted that, the above described embodiments for determining answerer clients may be combined. For example, the message may be sent to answerer clients within a preset range from the geographic location of the questioner client, among answerer clients having user tags that are matched with keywords in the message. Of course, other combinations may also be possible, but will not be detailed here for brevity.

Furthermore, in accordance with some feasible embodiments of the present invention, some restrictive measures may be taken to a message or users of answerer clients capable of answering that message, in order to make the questioning and answering more efficient and secure. For example, the following embodiments may be implemented:

In accordance with some feasible embodiments, as shown in FIG. 4, the method of the present invention may further comprise step S411: filtering out a spam massage from the received messages with a spam filtering technique. The specific type of the spam filtering technique used is not limited, for example, a spam message may be found by matching messages with spam keywords, and thereby filtering out the spam message. With this embodiment, the content of a message may be made more secure.

In accordance with some feasible embodiments of the present invention, as shown in FIG. 4, the method of the present invention may further comprise the followings steps. S412: matching the received message with history messages. It should be noted that, the way of obtaining history messages is not limited. For example, a history message may be obtained by searching through a search engine, or may be present in a preset history knowledge database. Step S413: if a history message matched with the received message is found, feeding back an answer to the matched history message to the user of the questioner client, and stopping the step S420 of sending the message to one or more answerer clients. The matching conditions for determining whether a message is matched with a history message are not limited, for example, a match may be determined when a matching degree between all words in the message and the history message exceeds a certain threshold (e.g., 90%), or, a mismatch may be determined when a matching degree of keywords in the message and the history message exceeds a certain threshold, and so on. Step S414: performing step S420 if no history message is found to be matched with the received message. The step of matching the received message with history messages may be performed in parallel with the step of sending the message to the answerer clients. Alternatively, the step of matching the received message with history messages may be performed first, and the step of sending the message to the answerer clients may then be performed in the case that no matching history message is found. Regardless of being performed in parallel or in succession, the message may be stopped from being sent to the answerer clients so long as it is determined that a matching history message is found. The sending the message to the answerer clients may be stopped immediately after a matching history message is found, or the user of the questioner client may be further requested to confirm whether an answer to the history message is satisfactory after returning the answer to the user, and stop sending the message to the answerer clients upon receiving a confirmation of satisfactory from the user by the question-and-answer server. With this embodiment, the questioner client may obtain an answer to the message as quickly as possible, thereby increasing the efficiency of questioning and answering.

According to some feasible embodiments of the present invention, as shown in FIG. 4, the method of the present invention may further comprise the following steps. Step S430: receiving activeness scores returned by the user of the questioner client for the users of the answerer clients. Step S431: calculating activeness levels for the users of the answerer clients based on the activeness scores returned for the users of the answerer clients in conjunction with a preset algorithm. In particular, the preset algorithm may be set as needed. For example, the preset algorithm may be an algorithm that takes the average of activeness scores received within preset time duration, or an algorithm that multiplies activeness scores received within preset time duration with level values of questioner clients that give the activeness scores respectively and subsequently taking the average thereof. Step S432: if the activeness levels for the users of the answerer clients are within a malicious activeness level range (e.g., the malicious activeness level range may be '0'), forbidding the users of the answerer clients to enter into a session with the user of the questioner client when the users of the answerer clients perform reply operations. For example, if it is determined that a user of an answerer client is within the malicious activeness level range after receiving the activeness score for the user of the answerer client, the user of the answerer client may be forbidden to enter into a session with the user of the questioner client within a preset time duration. After a time duration during which the user of the answerer client is forbidden to enter into a session has exceeded the preset time duration, the right of the user of the answerer client to enter into a session with the user of the questioner client may be restored according to requirements of implementation scenarios. In accordance with this embodiment, malicious disturbance to the question-and-answer system by users may be avoided.

In accordance with some feasible embodiments of the present invention, as shown in FIG. 4, the method of the present invention may further comprise, after the question-and-answer server receives the message sent by the user through the questioner client, step S415: screening for users of the answerer clients capable of answering the message according to a screening rule set by the user of the questioner client. It should be noted that, the screening rule that can be set by the user is not limited, and may specifically be set according to requirements of implementation scenarios. For example, the screening rule may be a screening rule of screening out an answerer having a particular user tag or screening out an answerer whose activeness level exceeds a particular threshold, and the like. In addition, after the users of the answerer clients capable of answering the message are screened out, those users may also be ranked, wherein ranking can be carried out according to a ranking rule set by the user of the questioner client, or according to a ranking rule preset by the question-and-answer server; for example, the more questions a user has answered, the higher the user is ranked. Step S416: permitting the screened-out users of the answerer clients capable of answering the message to enter into a session with the user of the questioner client. Step S417: forbidding the users of the answerer clients incapable of answering the message to enter into a session with the user of the questioner client. For example, in this embodiment, the message may only be sent to the screened-out users of the answerer clients capable of answering the message. As another example, it is possible to determine whether a user of an answerer client is one of the users screened out in advance who are capable of answering the message while the user of the answerer client is performing a real time reply operation for the message, and if yes, the user of the answerer client may be added to the instant messaging session group for answering the message, otherwise a message that the user of the answerer client is forbidden to be added into the instant messaging session group for answering the message may be returned to the user of the answerer client. In accordance with this embodiment, the questioner client may select users of the answerer clients who meet to his/her own requirements by setting a screening rule, thereby achieving higher efficiency in questioning and answering.

In accordance with some feasible embodiments of the present invention, as shown in FIG. 4, the method of the present invention may further comprise the following steps. Step S433: receiving cost parameters returned by the users of the answerer clients for the message. Step S434: sending the cost parameters to the questioner client such that the user of the questioner client selects a user of an answerer client capable of answering the message according to the cost parameters. It should be noted that, the form of the cost parameter in practical applications is not limited. For example, the cost parameter may be user credits required by an answerer client for answering the question proposed in the message. If the user of the questioner client selects a user of a certain answerer client, then the user credits required by the answerer client are deducted from the user of the questioner client after the user of the answerer client has provided a reply message through a session, and the question-and-answer server may further add the deducted user credits to the user of the answerer client. For example, the user of the questioner client may select a user of an answerer client who requires user credits for answering the question proposed in the message that is less than or equal to the user credits that the user of the questioner client owns. In accordance with this embodiment, the user of the questioner client is provided with more choices, and the users of the answerer clients may be rewarded accordingly, thereby facilitating the motivation of question-and-answer interaction.

In accordance with some feasible embodiments of the present invention, real name information of at least a part of the users of the answerer clients and the user of the questioner client may be pre-registered in a database accessible to the question-and-answer server. The real name information may be, for example, a telephone number, identity information, a real name, real occupation information, and the like. As an example, Yixin requires a user to register with a telephone number at a client, after which a verification code for registration in the form of a message is sent from the server side to the client, and then the user of the client makes a successful registration by returning the correct verification code to the server side. As another example, Yixin may require a user to register with a real name and identity card information. Moreover, the method may further comprise examining the real name information of at least a part of the users of the answerer clients by the question-and-answer server, and determining the users who pass the examination as qualified users for answering the messages sent by the questioner. For example, the examination may be performed by verifying the authenticity of a telephone number from a corresponding mobile communications service provider, providing a name and identify information to a Public Security System for verification, and the like.

Alternatively, it should be understood to those skilled in the art that various designs may be made as to which user in the question-and-answer system should be pre-registered with real name information and which policy should be utilized in examining such information. For example, users who answer a particular type of questions are required to conduct real name pre-registration and examination, or only the answerers are required to conduct real name pre-registration and examination, and so on. The present invention will not be limited in this respect.

It is noted that steps S411-S417 and S430-S434 in FIG. 4 are drawn in dotted lines to indicate that these steps are not necessary steps of the invention.

Second Exemplary Device

Having introduced the method for questioning and answering applied at a question-and-answer server in accordance with an exemplary embodiment of the present invention, a device for questioning and answering configured at a question-and-answer server in accordance with the exemplary embodiments of the present invention will then be described in details below with reference to FIG. 5.

Figure 5:
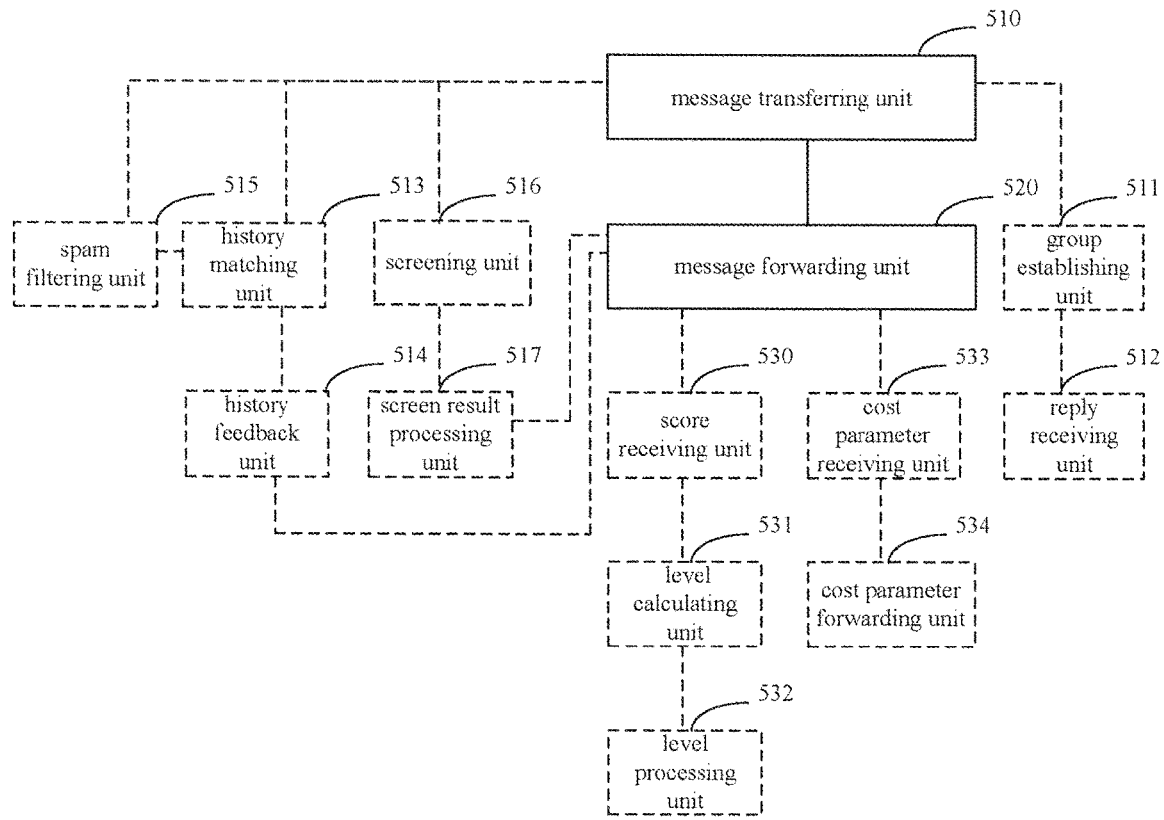
FIG. 5 schematically illustrates a structure diagram of a device for questioning and answering configured at a question-and-answer server in accordance with an embodiment of the invention.

For instance, referring to FIG. 5, there is shown a structure diagram of a device for questioning and answering configured at a question-and-answer server in accordance with an example of the present invention. As shown, a feasible embodiment of the example of the present invention may comprise: a message transferring unit 510 that may be configured to receive a message sent by a user through a questioner client; and a message forwarding unit 520 that may be configured to send the message to one or more answerer clients, such that the questioner client, in response to users of the answerer clients performing a real time reply operation for the message, enters into a real time session with the users of the answerer clients so as to obtain a reply message from the users of the answerer clients through the real time session.

It can be seen that, by configuring the device provided by the example of the present invention at the question-and-answer server, better immediacy may be achieved since a questioner and an answerer may send and receive messages through clients dedicated for questioning and answering, and both parties may enter into a one-to-one or one-to-many real time session when the answerer replies in real time.

As another example, in some embodiments, as shown in FIG. 5, the device provided by the example of the present invention may further comprise: a group establishing unit 511 that may be configured to establish an instant messaging session group for the user of the questioner client, such that the users of the answerer clients and the user of the questioner client enter into a session through the instant messaging session group; and a reply receiving unit 512 that may be configured to receive a reply message sent in real time by the users of the answerer clients for the message, and send the reply message to members of the instant messaging session group.

In the example of the present invention, the specific embodiment for the question-and-answer server to send the message to the one or more answerer clients is not limited. For example, in some feasible embodiments, the message forwarding unit 520 may be configured to send the message to all of the answerer clients; or, it may be configured to send the message to answerer clients whose geographic locations are within a preset range from the geographic location of the questioner client; or, it may be configured to send the message to answerer clients having user tags that are matched with keywords in the message. It should be noted that, these embodiments for determining answerer clients may be combined. For example, the message forwarding unit 520 may be configured to send the message to answerer clients within a preset range from the geographic location of the questioner client, among answerer clients having user tags that are matched with the message. Of course, other combinations may also be possible, but will not be detailed here for brevity.

Furthermore, in accordance with some feasible embodiments of the present invention, some restrictive measures may be taken to a message or users of answerer clients capable of answering that message, in order to make the questioning and answering more efficient and secure. For example, the following embodiments may be implemented:

In accordance with some feasible embodiments of the present invention, as shown in FIG. 5, the device may further comprise: a history matching unit 513 that may be configured to match the received message with history messages; and a history feedback unit 514 that may be configured to feedback, if a history message matched with the received message is found, the answer to the matched history message to the user of the questioner client, and stop executing the message forwarding unit. In addition, execution of the message forwarding unit can be triggered, if no history message is found to be matched with the received message.

In accordance with some feasible embodiments of the present invention, as shown in FIG. 5, the device may further comprise: a score receiving unit 530 that may be configured to receive activeness scores returned by the user of the questioner client for the users of the answerer clients; a level calculating unit 531 that may be configured to calculate activeness levels for the users of the answerer clients based on the activeness scores returned for the users of the answerer clients in conjunction with a preset algorithm; and a level processing unit 532 that may be configured to forbid the users of the answerer clients to enter into a session with the user of the questioner client when the users of the answerer clients perform reply operations if the activeness levels for the answerer clients are within a malicious activeness level range.

In accordance with some feasible embodiments of the present invention, as shown in FIG. 5, the device may further comprise: a spam filtering unit 515 that may be configured to filter out a spam message from the received message with a spam filtering technique.

In accordance with some feasible embodiments of the present invention, as shown in FIG. 5, the device may further comprise: a screening unit 516 that may be configured to screen for users of the answerer clients capable of answering the message according to a screening rule set by the user of the questioner client; and a screen result processing unit 517 that may be configured to permit the screened-out users of the answerer clients capable of answering the message to enter into a session with the user of the questioner client, and forbid the users of the answerer clients incapable of answering the message to enter into a session with the user of the questioner client.

In accordance with some feasible embodiments of the present invention, as shown in FIG. 5, the device may further comprise: a cost parameter receiving unit 533 that may be configured to receive cost parameters returned by the users of the answerer clients for the message; and a cost parameter forwarding unit 534 that may be configured to send the cost parameters to the questioner client, such that the user of the questioner client selects an answerer client capable of answering the message according to the cost parameters.

It is noted that, the group establishing unit 511, the reply receiving unit 512, the history matching unit 513, the history feedback unit 514, the spam filtering unit 515, the screening unit 516, the screen result processing unit 517, the score receiving unit 530, the level calculating unit 531, the level processing unit 532, the cost parameter receiving unit 533, and the cost parameter forwarding unit 534 are drawn in dotted lines in the FIG. 5 to indicate that these units are not necessary units of the present invention.

Third Exemplary Method

A method for questioning and answering applied at an answerer client in accordance with an exemplary embodiment of the present invention will be described below with reference to FIG. 6, in connection with the application scenario of FIG. 1.

Figure 6:
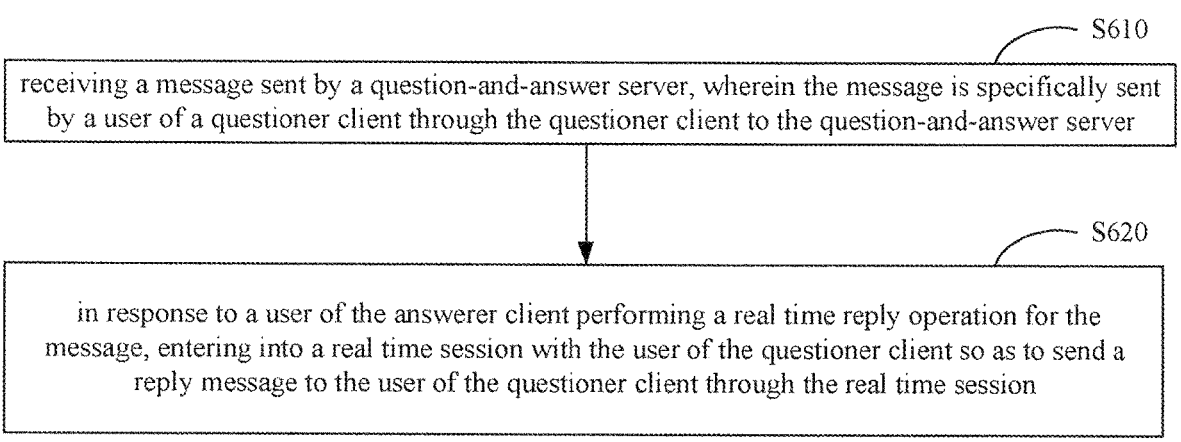
FIG. 6 schematically illustrates a flow diagram of a method for questioning and answering applied at an answerer client in accordance with an embodiment of the invention.

For instance, referring to FIG. 6, there is shown a flow diagram of a method for questioning and answering applied at an answerer client provided by an example of the present invention. As shown, a feasible embodiment of the example of the present invention may comprise:

Step S610: receiving a message sent by a question-and-answer server, wherein the message is sent by a user of a questioner client through the questioner client to the question-and-answer server;

Step S620: in response to a user of the answerer client performing a real time reply operation for the message, entering into a real time session with the user of the questioner client so as to send a reply message to the user of the questioner client through the real time session.

As an example, in some feasible embodiments, the user of the answerer client may make a phone call in real time to the user of the questioner client for the message, such that the user of the questioner client and the user of the answerer client enter into a voice session by picking up the call.

As another example, in some other feasible embodiments, the user of the answerer client may send a reply message in real time to the question-and-answer server for the message, such that the user of the questioner client and the user of the answerer client enter into a session through an instant messaging session group established by the question-and-answer server for the user of the questioner client.

With the method provided by the example of the present invention, better immediacy may be achieved since a questioner and an answerer may send and receive messages through clients dedicated for questioning and answering, and both parties may accordingly enter into a one-to-one or one-to-many real time session when the answerer replies in real time.

Third Exemplary Device

A device for questioning and answering configured at an answerer client in accordance with an exemplary embodiment of the present invention will be described in details below with reference to FIG. 7, in connection with the application scenario of FIG. 1.

Figure 7:
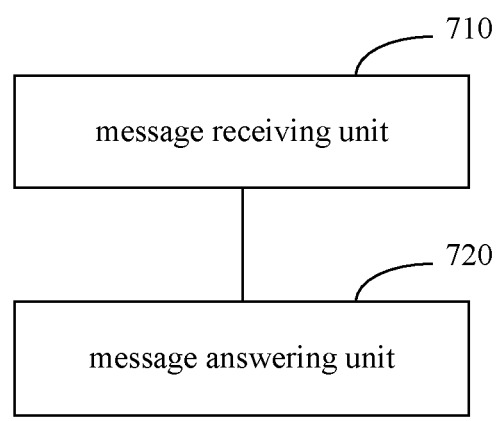
FIG. 7 schematically illustrates a structure diagram of a device for questioning and answering configured at an answerer client in accordance with an embodiment of the invention.

For instance, referring to FIG. 7, there is shown a structure diagram of a device for questioning and answering configured at an answerer client in accordance with an example of the present invention. As shown, a feasible embodiment of the example of the present invention may comprise: a message receiving unit 710 that may be configured to receive a message sent by a question-and-answer server, wherein the message is specifically sent by a user of a questioner client through the questioner client to the question-and-answer server; and a message answering unit 720 that may be configured to enter into, in response to a user of the answerer client performing a real time reply operation for the message, a real time session with the user of the questioner client so as to send a reply message to the user of the questioner client through the real time session.

It can be seen that, with the method provided by the example of the present invention being applied at the answerer client, better immediacy may be achieved since a questioner and an answerer may send and receive messages through clients dedicated for questioning and answering, and both parties may enter into a one-to-one or one-to-many real time session when the answerer replies in real time.

It should be noted that, although a number of units or sub-units of the device for questioning and answering have been set forth in the above detailed description, such division is non-mandatory. In fact, the features and functionalities of two or more of the units described above may be embodied in a single unit, in accordance with the embodiments of the invention. Conversely, the features and functionalities of a single unit describe above may be further divided to be embodied by a plurality of units.

Moreover, although the operations of the method of the present invention have been described in a specific order/sequence in the drawings, this does not require or imply that those operations are necessarily performed in such specific order/sequence, or that all of the illustrated operations have to be performed to achieve desired results. Additionally or alternatively, certain steps may be omitted, a plurality of steps may be combined and performed in a single step, and/or a single step may be broken up into and performed in a plurality of steps.

Although the spirit and principles of the present invention have been described with reference to a number of specific embodiments, it should be understood that the present invention is not limited to the disclosed specific embodiments, and the division of various aspects does not mean that features in those aspects cannot be combined to benefit, and such division is merely for the convenience of presentation. The present invention is intended to cover various modifications and equivalent arrangements within the spirit and scope of the appended claims.

What is claimed is:

1. A method for questioning and answering applied at a questioner client, comprising:
   receiving a question message containing a question input by a user;
   sending the question message to a question-and-answer server; and
   entering into an instant messaging session with users of a plurality of answerer clients through an instant messaging session group so as to obtain at least one reply message, for the question message, from the users of the plurality of answerer clients through the instant messaging session group,
   wherein the instant messaging session group, members of which comprises the user of the questioner client and the users of the plurality of answerer clients, is established by the question-and-answer server, when the question message is received from the questioner client, so that the question message is sent by the question-and-answer server to the plurality of answerer clients and the at least one reply message, containing at least one answer to the question, received by the question-and-answer server from at least one of the plurality of answerer clients is sent in real time by the question-and-answer server to both the questioner client and the plurality of answerer clients, and wherein user tags of the users of the plurality of answerer clients are matched with key words in the question message, and activeness levels of the users of the plurality of answerer clients are out of a malicious activeness level range, the activeness levels for the users of the plurality of answerer clients being calculated based on activeness scores of the users of the plurality of answerer clients in conjunction with a preset algorithm, the activeness scores being previously returned by users of questioner clients for the users of the plurality of answerer clients.

2. The method of claim 1, wherein the question message is a voice message, a text message, or a multimedia message.

3. A method for questioning and answering applied at a question-and-answer server, comprising:

establishing, when a question message, containing a question input by a user of a questioner client, sent by the questioner client is received, an instant messaging session group, members of which comprises the user of the questioner client and users of a plurality of answerer clients, such that the user of the questioner client enters into an instant messaging session with the users of the plurality of answerer clients through the instant messaging session group;

sending the question message to the plurality of answerer clients;

receiving at least one reply message, containing at least one answer to the question, sent in real time by at least one of the plurality of answerer clients for the message; and sending the at least one reply message in real time to both the questioner client and the plurality of answerer clients, wherein user tags of the users of the plurality of answerer clients are matched with key words in the question message, and activeness levels of the users of the plurality of answerer clients are out of a malicious activeness level range, the activeness levels for the users of the plurality of answerer clients being calculated based on activeness scores of the users of the plurality of answerer clients in conjunction with a preset algorithm, the activeness scores being previously returned by users of questioner clients for the users of the plurality of answerer clients.

4. The method of claim 3, further comprising:
matching the received question message with history question messages; and
if a history question message matched with the received question message is found, feeding back a history answer to a history question contained in the matched history question message to the questioner client, and stopping the step of sending the question message to the plurality of answerer clients.

5. The method of claim 3, further comprising:
filtering out a spam message from the received question message with a spam filtering technique.

6. The method of claim 3, wherein geographic locations of the plurality of answerer clients are within a preset range from the geographic location of the questioner client.

7. The method of claim 3, further comprising after receiving the question message from the questioner client:

screening for users of the plurality of answerer clients capable of answering the question message according to a screening rule set by the user of the questioner client;

permitting the screened-out users of the plurality of answerer clients capable of answering the question message to enter into a session with the user of the questioner client; and forbidding the users of other answerer clients incapable of answering the question message to enter into a session with the user of the questioner client.

8. The method of claim 3, further comprising:
receiving cost parameters returned by the users of the plurality of answerer clients for the question message; and
sending the cost parameters to the questioner client such that the user of the questioner client selects an answerer client capable of answering the question message according to the cost parameters.

9. The method of claim 3, wherein real name information of at least a part of the users of the plurality of answerer clients and the user of the questioner clients pre-registered in a database accessible to the question-and-answer server.

10. A device for questioning and answering configured at a question-and-answer server, comprising:

a message transferring unit configured to receive a question message, containing a question input by a user of a questioner client, sent by the questioner client;

a group establishing unit configured to establish, when the question message is received by the message transferring unit, an instant messaging session group, members of which comprises the user of the questioner client and users of a plurality of answerer clients, such that the user of the questioner client enters into an instant messaging session with the users of the plurality of answerer clients through the instant messaging session group;

a message forwarding unit configured to send the question message to the plurality of answerer clients; and a reply receiving unit configured to receive at least one reply message, containing at least one answer to the question, sent in real time by at least one of the plurality of answerer clients, and send the at least one reply message in real time to both the questioner client and the plurality of answerer clients, wherein user tags of the users of the plurality of answerer clients are matched with key words in the question message, and activeness levels of the users of the plurality of answerer clients are out of a malicious activeness level range, the activeness levels for the users of the plurality of answerer clients being calculated based on activeness scores of the users of the plurality of answerer clients in conjunction with a preset algorithm, the activeness scores being previously returned by users of questioner clients for the users of the plurality of answerer clients.

11. The device of claim 10, further comprising:
a history matching unit configured to match the received question message with history question messages; and
a history feedback unit configured to feedback, if a history question message matched with the received question message is found, a history answer to a history question contained in the matched history question message to the questioner client, and stop the execution of the message forwarding unit.

12. The device of claim 10, further comprising a spam filtering unit configured to filter out a spam message from the received question message with a spam filtering technique.

13. The device of claim 10, wherein geographic locations of the plurality of answerer clients are within a preset range from the geographic location of the questioner client.

14. The device of claim 10, further comprising:
a screening unit configured to screen for users of the plurality of answerer clients capable of answering the question message according to a screening rule set by the user of the questioner client; and
a screen result processing unit configured to permit the screened-out users of the plurality of answerer clients capable of answering the question message to enter into a session with the user of the questioner client, and forbid the users of other answerer clients incapable of answering the question message to enter into a session with the user of the questioner client.

15. The device of claim 10, further comprising:
a cost parameter receiving unit configured to receive cost parameters returned by the users of the plurality of answerer clients for the question message; and
a cost parameter forwarding unit configured to send the cost parameters to the questioner client, such that the user of the questioner client selects an answerer client capable of answering the question message according to the cost parameters.

* * * * *